United States Patent
Lin et al.

(10) Patent No.: US 11,050,351 B2
(45) Date of Patent: Jun. 29, 2021

(54) CONTROL METHOD IN USE OF ACTIVE-CLAMP FLYBACK POWER CONVERTER

(71) Applicant: Weltrend Semiconductor Inc., Hsinchu (TW)

(72) Inventors: Mu-Chih Lin, Hsinchu (TW); Chun-Teh Chen, Hsinchu (TW); Ren-Yi Chen, Hsinchu (TW); Ming-Ying Kuo, Hsinchu (TW); Jeng-Cheng Liu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 15/930,710

(22) Filed: May 13, 2020

(65) Prior Publication Data

US 2021/0091672 A1    Mar. 25, 2021

(30) Foreign Application Priority Data

Sep. 25, 2019 (TW) .................................. 108134684

(51) Int. Cl.
  *H02M 3/335*  (2006.01)
  *H02M 1/08*   (2006.01)
  *H02M 1/00*   (2006.01)

(52) U.S. Cl.
  CPC ....... *H02M 3/33523* (2013.01); *H02M 1/083* (2013.01); *H02M 1/0058* (2021.05)

(58) Field of Classification Search
  CPC .. H02M 1/083; H02M 3/335; H02M 3/33576; H02M 3/33507; H02M 3/33523; H02M 3/33569; H02M 3/33592; H02M 2001/0058
  See application file for complete search history.

(56) References Cited

U.S. PATENT DOCUMENTS

| 7,609,533 | B2 * | 10/2009 | Chuang | H02M 3/33523 363/19 |
|---|---|---|---|---|
| 8,873,254 | B2 * | 10/2014 | Morris | H02M 3/335 363/21.14 |
| 10,666,153 | B2 * | 5/2020 | Chen | H02M 3/33576 |
| 10,897,205 | B2 * | 1/2021 | Shen | H02M 1/08 |
| 2011/0305048 | A1 * | 12/2011 | Yang | H02M 1/083 363/21.03 |
| 2014/0204620 | A1 * | 7/2014 | Skinner | H02M 3/33507 363/21.01 |

* cited by examiner

*Primary Examiner* — Adolf D Berhane
(74) *Attorney, Agent, or Firm* — McClure, Qualey & Rodack, LLP

(57) ABSTRACT

A control method is introduced to operate an ACF power converter under a non-complimentary mode. A high-side switch is turned ON at least twice within a switching cycle of a low-side switch, to provide at least two high-side ON times. One of the high-side ON times follows the end of demagnetization time of a transformer in the ACF power converter, and the other follows the end of the blanking time that controls the maximum switching frequency of the low-side switch.

11 Claims, 6 Drawing Sheets

CONTROL METHOD IN USE OF ACTIVE-CLAMP FLYBACK POWER CONVERTER

CROSS-REFERENCE TO RELATED APPLICATION

This application claims priority to and the benefit of Taiwan Application Series Number 108134684 filed on Sep. 25, 2019, which is incorporated by reference in its entirety.

BACKGROUND

The present disclosure relates generally to active clamp flyback power converters, more particularly to control methods for active clamp flyback power converters operating in a non-complementary mode.

Flyback converts have been commonly employed by power supplies for electric products such as appliances, computers, battery chargers, and so on. Each of traditional flyback converts needs a snubber to wastefully consume the electric energy accumulated by leakage inductance of a primary inductor. Nowadays, active clamp flyback (ACF) power converters are introduced to replace the snubber with an active-clamp circuit, which recycles the electric energy from the leakage inductance and improves power efficiency. An ACF power converter has two major power switches. One is named high-side switch, located in an active-clamp circuit, and the other is low-side switch, connected between a primary winding and a ground line.

One operation mode for an ACF power converter is named complimentary mode, which substantially operates the high-side and low-side switches at complimentary states. In other words, the complimentary mode turns the high-side switch substantially ON if the low-side switch is OFF, and the low-side switch ON if the high-side switch is OFF, while a brief dead time, the period when both the high-side and low-side switches are OFF, is inserted to avoid any short through from happening. The complimentary mode could cause both the high-side and low-side switches to enjoy zero-voltage switching (ZVS), a condition indicating that the voltage drop across the conductive channel of a switch is about zero when the switch changes its status from OFF to ON. ZVS is welcome because of low switching loss. When the load of an ACF power converter is heavy, the complimentary mode can make the ACF power converter have excellent conversion efficiency. When the load is light, however, the conversion efficiency becomes poor if the ACF power converter is still operated under the complimentary mode, mostly because of prominent circulated current that cycles through a primary winding.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

The following specification teaches a power converter with a flyback topology as an embodiment of the invention, but the invention is not limited to however. It is to be understood that the disclosure and the teaching herein is not intended to limit the scope of the invention.

An embodiment of the invention controls a high-side switch and a low-side switch of an ACF power converter under a non-complimentary mode. The low-side switch is turned ON or OFF substantially according to a quasi-resonant (QR) mode, to create switching cycles. Within each switching cycle, the high-side switch is turned ON at least twice, to provide at least two high-side ON times. One of the high-side ON times is after the end of a demagnetization time of a transformer in the ACF power converter, and the other is after the end of the blanking time that controls the maximum switching frequency of the low-side switch. The final one of the high-side ON times makes the low-side switch enjoy ZVS, so as to increase power conversion efficiency of the ACF power converter.

Figure 1:
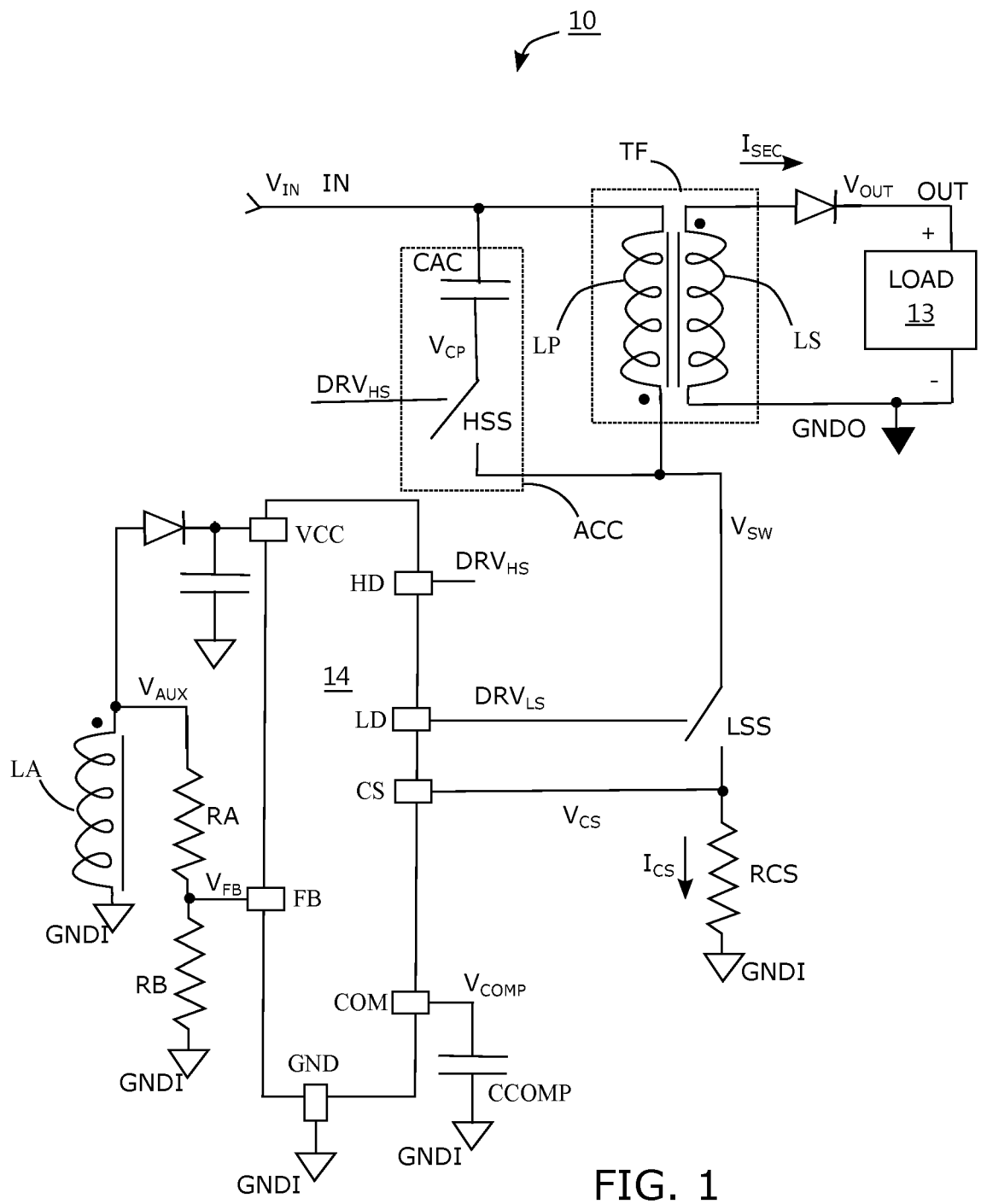
FIG. 1 shows ACF power converter 10 according to embodiments of the invention.

FIG. 1 shows ACF power converter 10 according to embodiments of the invention, that supplies electric power to load 13. ACF power converter 10 includes, but is not limited to have, transformer TF, active clamp circuit ACC, low-side switch LSS, current-sense resistor RCS, and power controller 14. Transformer TF has primary winding LP, secondary winding LS and auxiliary winding LA, inductively coupled to one another. Primary winding LP of transformer TF, low-side switch LSS and current-sense resistor RCS are connected in series between input power line IN and input power ground GNDI, as shown in FIG. 1. Current-sense voltage $V_{CS}$ at the node connecting low-side switch LSS and current-sense resistor RCS is a representative of the current flowing through low-side switch LSS and primary winding LP when low-side switch LSS is turned ON. Active clamp circuit ACC is connected in parallel with primary winding LP and includes capacitor CAC and high-side switch HSS connected in series.

Power controller 14 turns ON and OFF high-side switch HSS and low-side switch LSS, to vary the current through primary winding LP, so secondary winding LS inductively and accordingly generates alternating-current (AC) voltage or current, rectification of which provides output voltage $V_{OUT}$ at output power line OUT while the voltage at output power ground GNDO is deemed as ground for the secondary side. Output voltage $V_{OUT}$ acts as a power source to supply power to load 13, which for example is a rechargeable battery.

Compensation signal $V_{COMP}$ over compensation capacitor CCOMP is generated in accordance with the status of load 13. In one embodiment of the invention, an error amplifier and a photo coupler in the secondary side (not shown in FIG. 1) detects output voltage $V_{OUT}$ and accordingly affects compensation signal $V_{COMP}$, so as to provide negative feedback loop to power controller 14 to stabilize output voltage $V_{OUT}$. For example, the error amplifier compares output voltage $V_{OUT}$ with target voltage $V_{TAR}$ to affect compensation signal $V_{COMP}$ via the help of a photo coupler, so the output voltage $V_{OUT}$ is regulated at target voltage $V_{TAR}$. According to another embodiment of the invention, power controller 14 detects voltage drop $V_{AUX}$ across auxiliary winding LA via the help of feedback node FB and resistors RA and RB, to indirectly and inductively detect output voltage $V_{OUT}$, so as to control compensation signal $V_{COMP}$ and to provide a negative control loop stabilizing output voltage $V_{OUT}$ at target voltage $V_{TAR}$.

Power controller 14 could be an integrated circuit packaged with pins according to embodiments of the invention. Power controller 14 has inputs as current-sense voltage $V_{CS}$, compensation signal $V_{COMP}$, and feedback voltage $V_{FB}$ at corresponding pins to generate control signal $DRV_{HS}$ and $DRV_{LS}$, which control high-side switch HSS and low-side switch LSS respectively.

Figure 2:
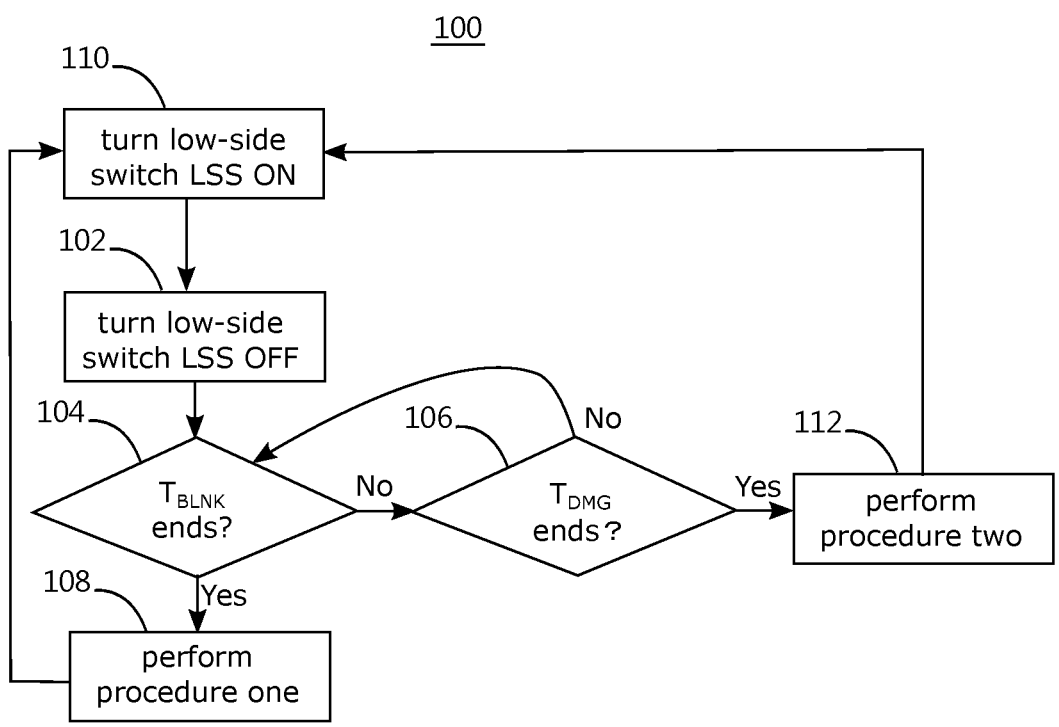
FIG. 2 demonstrates control method 100 used by power controller 14.

FIG. 2 demonstrates control method 100 in use of power controller 14. Step 110 turns low-side switch LSS ON, starting a new switching cycle. Step 102 turns low-side switch LSS OFF after a period of low-side ON time $T_{ON-LS}$. According to one embodiment of the invention, low-side ON time $T_{ON-LS}$ is determined in response to compensation signal $V_{COMP}$ and current-sense voltage $V_{CS}$. For example, once current-sense voltage $V_{CS}$ exceeds an attenuated signal $V_{CSMP-SC}$, a reduced version of compensation signal $V_{COMP}$, power controller 14 turns low-side switch LSS OFF to conclude low-side ON time $T_{ON-LS}$ and to start low-side OFF time.

During low-side ON time $T_{ON-LS}$, primary winding LP energizes because the magnetic energy it stores increases over time. Right after the moment when low-side switch LSS turns OFF, the energy stored by the leakage inductance of primary winding LP starts being transferred to capacitor CAC, charging. At the same time, transform TF demagnetizes, to supply power to output voltage $V_{OUT}$ or load 13. The duration during which transform TF demagnetizes is called demagnetization time $T_{DMG}$.

At the beginning of low-side ON time $T_{ON-LS}$ or the beginning of low-side OFF time when low-side switch LSS turns OFF, power controller 14 internally generates a blanking signal $S_{BLNK}$, used to define a blanking time $T_{BLNK}$. Power controller 14 is configured to turn low-side switch LSS ON again only after the end of blanking time $T_{BLNK}$. In other words, blanking time $T_{BLNK}$ determines the minimum switching cycle time, or the maximum switching frequency of low-side switch LSS. Therefore, blanking time $T_{BLNK}$ is in association with the maximum switching frequency of lower-side switch LSS. According to one embodiment of the invention, blanking signal $S_{BLNK}$ is generated by power controller 14 to count blanking time $T_{BLNK}$ in response to compensation signal $V_{COMP}$, which is determined in response to load 13. For instance, the lighter load 13, the smaller compensation signal $V_{COMP}$, the longer blanking time $T_{BLNK}$, and the smaller maximum switching frequency of lower-side switch LSS.

Steps 104 and 106 repeatedly check if blanking time $T_{BLNK}$ and demagnetization time $T_{DMG}$ end respectively. Step 108 follows to perform procedure one if blanking time $T_{BLNK}$ is found to end earlier than demagnetization time $T_{DMG}$. Otherwise, blanking time $T_{BLNK}$ ends later than demagnetization time $T_{DMG}$ does, and step 112 follows to perform procedure two.

After procedure one or two finishes, it is about the end of the present switching cycle, and control method 100 in FIG. 2 goes back to step 110, starting a new switching cycle.

Figure 3A:
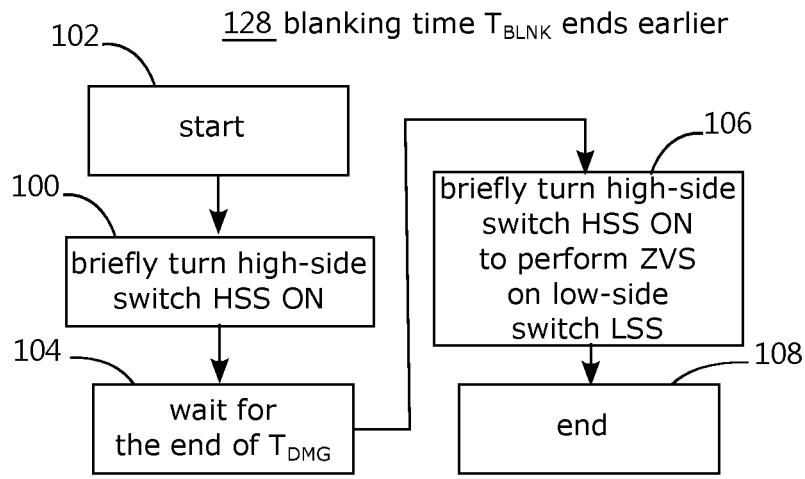
FIG. 3A shows procedure one in step 108 of FIG. 2.
Figure 3B:
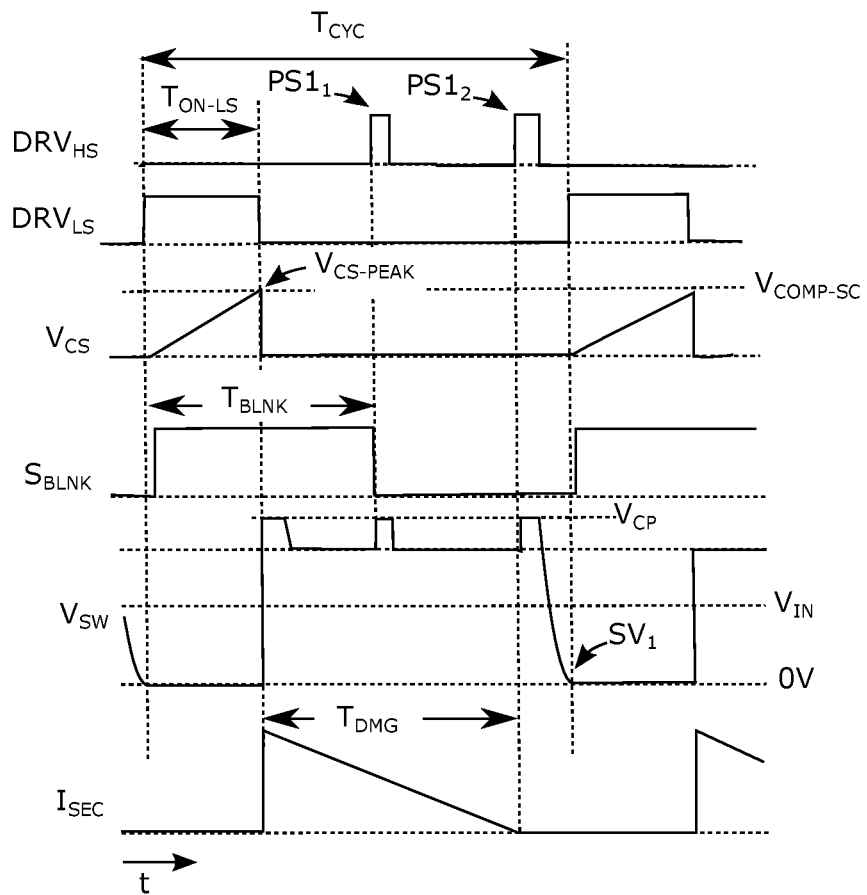
FIG. 3B demonstrates signal waveforms when procedure one is performed.

FIG. 3A shows procedure one in step 108, which is performed if blanking time $T_{BLNK}$ ends earlier than demagnetization time $T_{DMG}$. FIG. 3B demonstrates signal waveforms when procedure one is performed. Signal waveforms shown in FIG. 3B are of, from top to bottom, control signals $DRV_{HS}$ and $DRV_{LS}$, current-sense voltage $V_{CS}$, blanking signal $S_{BLNK}$, joint voltage $V_{SW}$ at the joint between primary winding LP and low-side switch LSS, and inductor current $I_{SEC}$ of secondary winding LS.

A switching cycle $T_{CYC}$ in FIG. 3B is a period of time between two consecutive rising edges of control signal $DRV_{LS}$. In the beginning of a switching cycle $T_{CYC}$, control signal $DRV_{LS}$ turns low-side switch LSS ON to start low-side ON time $T_{ON-LS}$, as having been detailed by steps 110 and 102 in FIG. 2. Power controller 14 makes current-sense voltage $V_{CS}$ peak when low-side ON time $T_{ON-LS}$ ends, and peak $V_{CS-PEAK}$ is about equal to attenuated signal $V_{COMP-SC}$, which associates linearly with compensation signal $V_{COMP}$ for example. $V_{COMP-SC}$ is equal to $V_{COMP}*K$, where K is a constant between 0 to 1, for instance.

Power controller 14 generates blanking signal $S_{BLNK}$ in response to compensation signal $V_{COMP}$, and blanking signal $S_{BLNK}$ in FIG. 3B turns into "1" in logic soon after the beginning of switching cycle $T_{CYC}$. According to an embodiment of the invention, blanking time $T_{BLNK}$ is defined to be the period of time between the beginning of switching cycle $T_{CYC}$ and the occurrence of the falling edge of blanking signal $S_{BLNK}$, as exemplified in FIG. 3B.

Right after the end of low-side ON time $T_{ON-LS}$, inductor current $I_{SEC}$ peaks to reflect peak $V_{CS-PEAK}$, which represents the peak of the current flowing through primary winding LP. Inductor current $I_{SEC}$ then decreases linearly over time as secondary winding LS releases its own electromagnetic power to output voltage $V_{OUT}$, and the electromagnetic power is about depleted when inductor current $I_{SEC}$ becomes 0 A. Demagnetization time $T_{DMG}$ could refer to the period of time from the end of low-side ON time $T_{ON-LS}$ to the moment when inductor current $I_{SEC}$ becomes 0 A, as exemplified in FIG. 3B.

It is supposedly shown in FIG. 3B that blanking time $T_{BLNK}$ ends earlier than demagnetization time $T_{DMG}$ does, so step 120 in procedure one of FIG. 3A starts right after the end of blanking time $T_{BLNK}$.

Step 122, following step 120, briefly turns high-side switch HSS ON for the first time. Shown in FIG. 3B, in response to the end of blanking time $T_{BLNK}$, control signal $DRV_{HS}$ has pulse $PS1_1$ to briefly turn high-side switch HSS ON. Joint voltage $V_{SW}$ is pulled up to about capacitor voltage $V_{CP}$ on capacitor CAC when high-side switch HSS is ON, as shown in FIG. 3B. Step 122 releases some energy stored by capacitor CAC.

The pulse width of pulse $PS1_1$ could be preset as a constant, or vary in response to capacitor voltage $V_{CP}$. The higher capacitor voltage $V_{CP}$, for example, the longer the pulse width of pulse $PS1_1$.

Step 124 in FIG. 3A follows step 122, waiting for the end of demagnetization time $T_{DMG}$. According to embodiments of the invention, power controller 14 detects voltage drop $V_{AUX}$ via feedback node FB to find if demagnetization time $T_{DMG}$ ends. It is expected that voltage drop $V_{AUX}$ is about a constant inductively reflecting output voltage $V_{OUT}$ during demagnetization time $T_{DMG}$. Demagnetization time $T_{DMG}$ seems to end if voltage drop $V_{AUX}$ is found dropping significantly. Presumably, voltage drop $V_{AUX}$ is about 11V during demagnetization time $T_{DMG}$ if output voltage $V_{OUT}$ is stably regulated at 5V. Power controller 14 could determine the occurrence of the end of demagnetization time $T_{DMG}$ if voltage drop $V_{AUX}$ is found to fall away from 11V. The end of demagnetization time $T_{DMG}$ that power controller 14 determines might be slightly different from the real end of demagnetization time $T_{DMG}$, but this difference does not affect the embodiment of the invention.

Step 126 in FIG. 3A follows step 124, briefly turning high-side switch HSS ON for the second time in this present switching cycle to perform ZVS on low-side switch LSS. Control signal $DRV_{HS}$, as shown in FIG. 3B, provides pulse $PS1_2$ right after demagnetization time $T_{DMG}$ to briefly turn high-side switch HSS ON. Pulse $PS1_2$ also provides a chance to release some energy stored in capacitor CAC. After the end of pulse $PS1_2$, joint voltage $V_{SW}$ drops rapidly. If the pulse width of pulse $PS1_2$ is appropriate, joint voltage $V_{SW}$ can drop low enough to make low-side switch LSS perform ZVS. As demonstrated in FIG. 3B, low-side switch LSS turns ON at the moment when joint voltage $V_{SW}$ is about 0V at the bottom of signal valley $SV_1$, performing ZVS.

According to one embodiment of the invention, power controller 14 checks if current-sense voltage $V_{CS}$ is about 0V at the beginning of every low-side ON time $T_{ON-LS}$, so as to determine whether low-side switch LSS is performing ZVS. If current-sense voltage $V_{CS}$ has a positive initial value in a low-side ON time $T_{ON-LS}$, power controller 14 increases the pulse width of pulse $PS1_2$. If not, power controller 14 decreases the pulse width of pulse $PS1_2$. Accordingly, the pulse width of pulse $PS1_2$, or the length of the final high-side ON time in a switching cycle, is adaptively adjusted to make low-side switch LSS perform ZVS.

Step 128 in FIG. 3A follows step 126 and ends procedure one.

Based on FIG. 3B and the above relevant teaching, there are only two high-side ON times within one switching cycle, one contributed by pulse $PS1_1$, and the other by pulse $PS1_2$. The first high-side ON time corresponding to pulse $PS1_1$ is within demagnetization time $T_{DMG}$ but follows the end of blanking time $T_{BLNK}$. The second high-side ON time corresponding to pulse $PS1_2$ follows or begins at about the end of demagnetization time $T_{DMG}$.

Figure 4A:
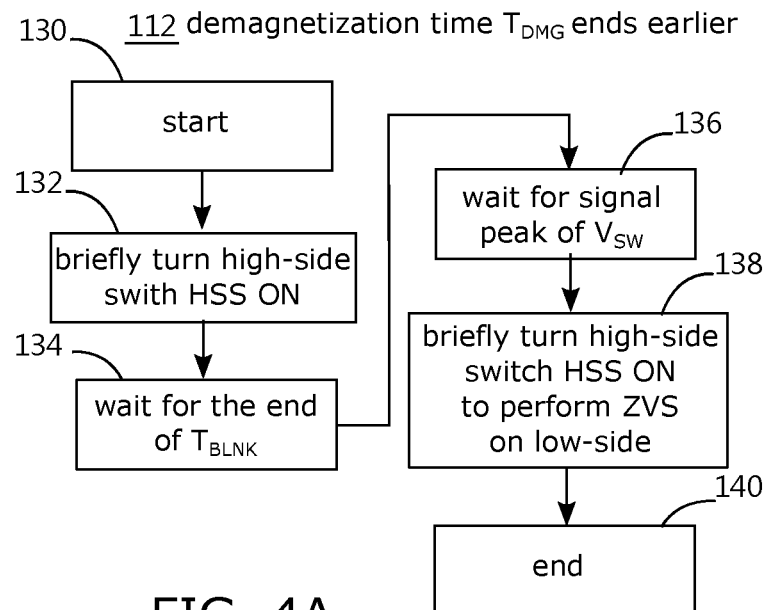
FIG. 4A demonstrates procedure two in step 112 of FIG. 2.
Figure 4B:
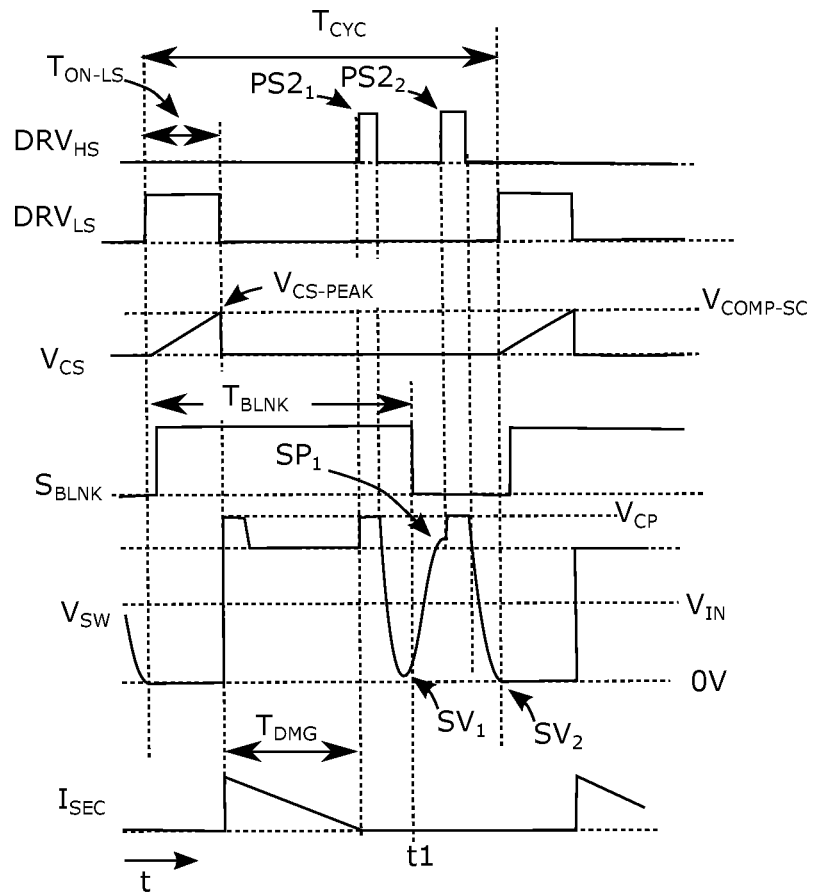
FIGS. 4B and 4C demonstrate signal waveforms when procedure two is performed.
Figure 4C:
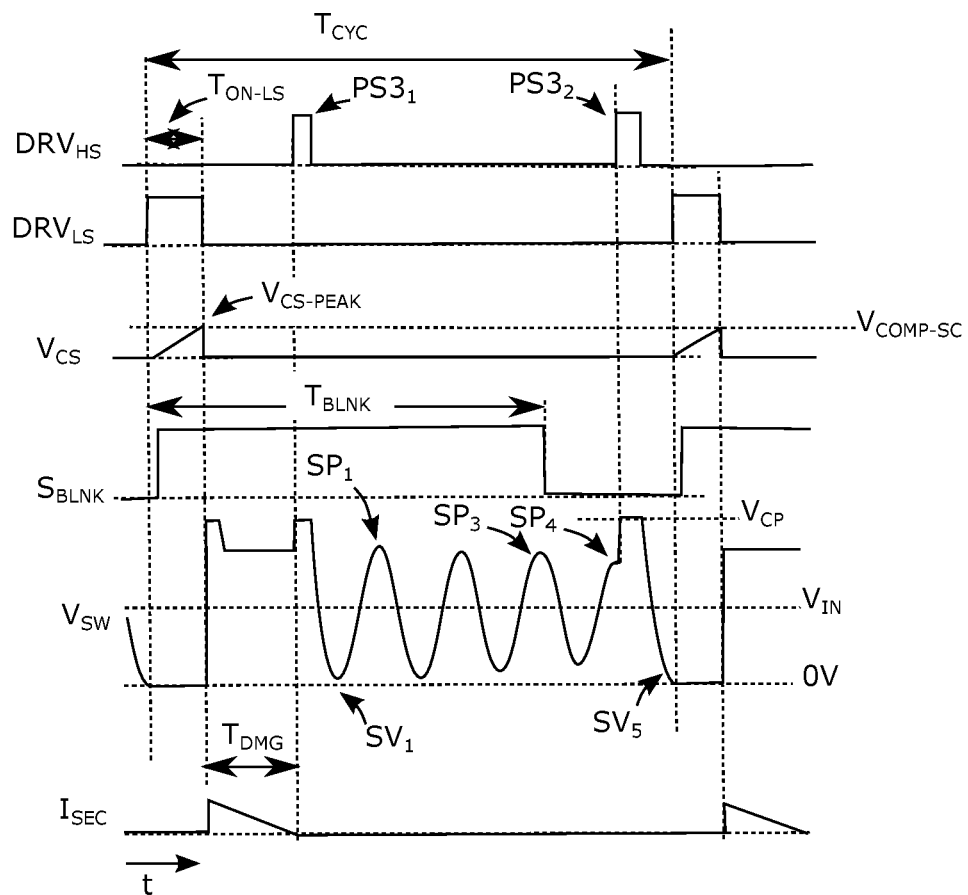

FIG. 4A demonstrates procedure two in step 112, which is performed if demagnetization time $T_{DMG}$ ends earlier than blanking time $T_{BLNK}$. FIGS. 4B and 4C demonstrate signal waveforms when procedure two is performed. Signal waveforms shown in each of FIGS. 4B and 4C are of, from top to bottom, control signals $DRV_{HS}$ and $DRV_{LS}$, current-sense voltage $V_{CS}$, blanking signal $S_{BLNK}$, joint voltage $V_{SW}$, and inductor current $I_{SEC}$.

Some aspects of FIGS. 4B and 4C are not detailed or explained because they have corresponding aspects in FIG. 3B which have been explained.

In comparison with attenuated signal $V_{COMP-SC}$ in FIG. 3B, attenuated signal $V_{COMP-SC}$ in FIG. 4B is lower, implying lower compensation signal $V_{COMP}$. Accordingly, in comparison with FIG. 3B, FIG. 4B has lower peak $V_{CS-PEAK}$, shorter low-side ON time $T_{ON-LS}$, and longer blanking time $T_{BLNK}$. Furthermore, demagnetization time $T_{DMG}$ in FIG. 4B is shorter because peak $V_{CS-PEAK}$ in FIG. 4B is less than that in FIG. 3B.

FIG. 4B shows that demagnetization time $T_{DMG}$ ends earlier than blanking time $T_{BLNK}$ does. Therefore, step 130 of FIG. 4A starts procedure two after the end of demagnetization time $T_{DMG}$.

Step 132, following step 130, briefly turns high-side switch HSS ON for the first time. Shown in FIG. 4B, right after or at about the end of demagnetization time $T_{DMG}$, control signal $DRV_{HS}$ has pulse $PS1_1$ to briefly turn high-side switch HSS ON. Joint voltage $V_{SW}$ is pulled up to about capacitor voltage $V_{CP}$ on capacitor CAC when high-side switch HSS is ON, as shown in FIG. 4B. Step 132 releases some energy stored by capacitor CAC. The pulse width of pulse $PS1_1$ could be a constant or varies in response to capacitor voltage $V_{CP}$.

Step 134 in FIG. 4A follows step 132, waiting for the end of blanking time $T_{BLNK}$. Shown in FIG. 4B, blanking time $T_{BLNK}$ ends at moment t1 when the $1^{st}$ signal valley $SV_1$ of joint voltage $V_{SW}$ about appears.

Step 136 in FIG. 4A waits for the occurrence of a signal peak of joint voltage $V_{SW}$. In FIG. 4B, signal peak $SP_1$ occurring after the end of demagnetization time $T_{DMG}$ is also the first signal peak after moment t1. According to an embodiment of the invention, power controller 14 uses feedback node FB to determine the moment when signal peak $SP_1$ occurs. For example, one embodiment of the invention detects voltage drop $V_{AUX}$ of auxiliary winding LA and treats the change of voltage drop $V_{AUX}$ from negative to positive as an indicator that a signal peak is going to happen soon.

In FIG. 4A, step 138 follows step 136, briefly turning high-side switch HSS ON for the second time, to perform ZVS on low-side switch LSS. When signal peak $SP_1$ is determined to be appearing, control signal $DRV_{HS}$ uses pulse $PS2_2$, which corresponds to the final high-side ON time in a switching cycle, to briefly turn high-side switch HSS ON. Pulse $PS2_2$ also causes to release some energy stored in capacitor CAC. After the end of pulse $PS2_2$, joint voltage $V_{SW}$ drops rapidly. If the pulse width of pulse $PS2_2$ is long enough, low-side switch LSS can be turned ON timely to performs ZVS. As aforementioned, the pulse width of pulse $PS2_2$ could be adaptively adjusted cycle by cycle to perform ZVS on low-side switch LSS.

Step 140, following step 138, concludes procedure two.

Based on FIG. 4B and the above relevant teaching, there are only two high-side ON times within the present switching cycle, one contributed by pulse $PS2_1$ of control signal $DRV_{HS}$, and the other by pulse $PS2_2$. The first high-side ON time corresponding to pulse $PS2_1$ starts after or at about the end of demagnetization time $T_{DMG}$. The second high-side ON time corresponding to pulse $PS2_2$ starts at about the moment when the first signal peak appears after the end of blanking time $T_{BLNK}$.

Pulse $PS2_1$ in FIG. 4B starts at the moment when the $1^{st}$ signal peak $SP_1$ after the end of demagnetization time $T_{DMG}$ occurs, but this invention is not limited to however. FIG. 4C also shows that there are only two high-side ON times within the present switching cycle, one contributed by pulse $PS3_1$, and the other by pulse $PS3_2$. Pulse $PS3_2$ starts at about moment when the $4^{th}$ signal peak $SP_4$ after the end of demagnetization time $T_{DMG}$ occurs.

Attenuated signal $V_{COMP-SC}$ in FIG. 4C is less than that in FIG. 4B. Accordingly, in comparison with what is showed in FIG. 4B, FIG. 4C has less peak $V_{CS}$, shorter low-side ON time $T_{ON-LS}$, longer blanking time $T_{BLNK}$, and shorter demagnetization time $T_{DMG}$.

Pulse $PS3_1$ of control signal $DRV_{HS}$ shown in FIG. 4C follows right after the end of demagnetization time $T_{DMG}$, to briefly turn high-side switch HSS ON for the first time.

In FIG. 4C, blanking time $T_{BLNK}$ ends about after the appearance of signal peak $SP_3$. Therefore, step 138 in FIG. 4A makes control signal $DRV_{HS}$ have pulse $PS3_2$ starting at about the moment when signal peak $SP_4$ appears. Pulse $PS3_2$ briefly turns high-side switch HSS ON to perform ZVS on low-side switch LSS.

Figure 5A:
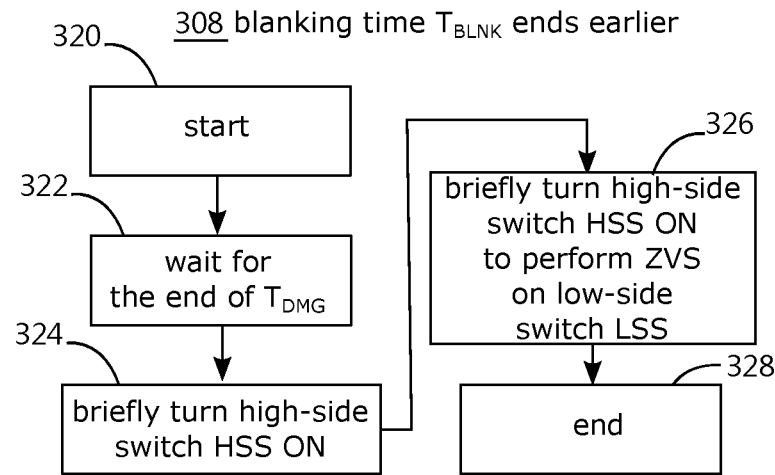
FIG. 5A demonstrates step 308 to perform procedure one in FIG. 2.
Figure 5B:
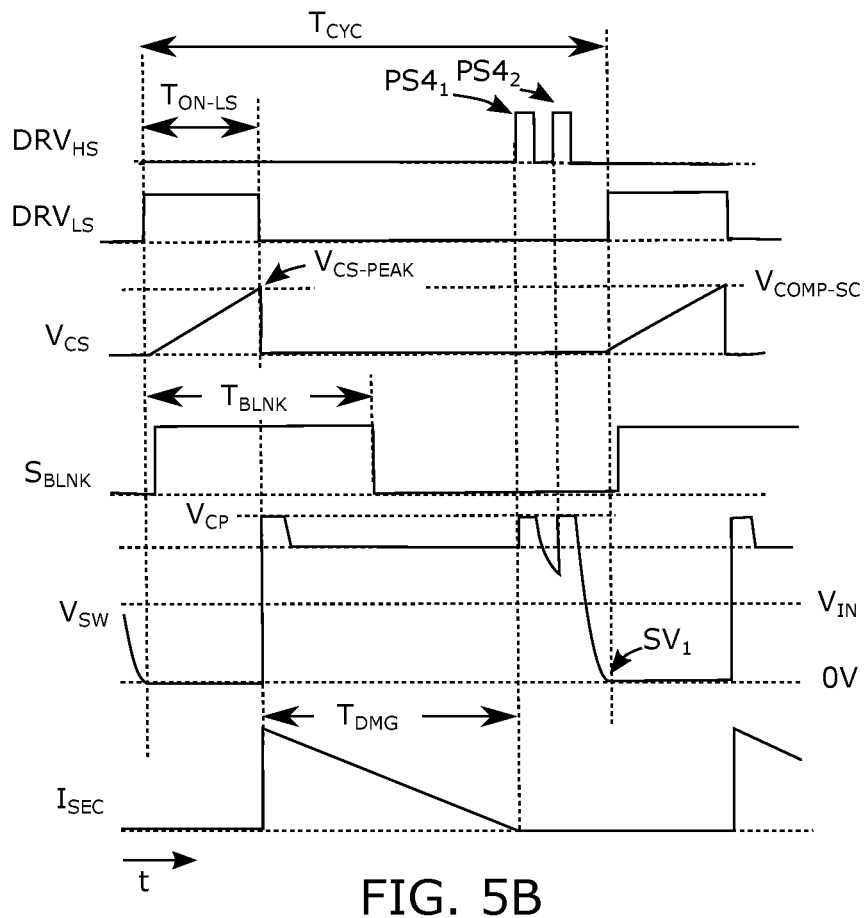
FIG. 5B demonstrates signal waveforms when step 308 is performed.

FIG. 5A demonstrates step 308, which, according to embodiments of the invention, replaces step 108 in FIG. 2 to perform procedure one. FIG. 5B demonstrates signal waveforms when step 308 is performed. Signal waveforms shown in FIG. 5B are of, from top to bottom, control signals $DRV_{HS}$ and $DRV_{LS}$, current-sense voltage $V_{CS}$, blanking signal $S_{BLNK}$, joint voltage $V_{SW}$, and inductor current $I_{SEC}$.

Some aspects of FIG. 5B are not detailed or explained because they have corresponding aspects in FIG. 3B which have been explained.

FIG. 5B obviously shows that blanking time $T_{BLNK}$ ends earlier than demagnetization time $T_{DMG}$ does. Therefore, regarding to the waveforms in FIG. 5B, step 320 in FIG. 5A starts procedure one.

Step 322 in FIG. 5A follows step 320, waiting for the end of demagnetization time $T_{DMG}$. According to embodiments of the invention, power controller 14 detects voltage drop $V_{AUX}$ via feedback node FB to find if demagnetization time $T_{DMG}$ ends. For example, demagnetization time $T_{DMG}$ seems to end if voltage drop $V_{AUX}$ is found dropping significantly.

Step 324, following step 322, briefly turns high-side switch HSS ON for the first time. Shown in FIG. 5B, in response to the end of blanking time $T_{BLNK}$, control signal $DRV_{HS}$ has pulse $PS4_1$ to briefly turn high-side switch HSS ON. Joint voltage $V_{SW}$ is pulled up to about capacitor voltage $V_{CP}$ on capacitor CAC when high-side switch HSS is ON, as shown in FIG. 5B. Step 324 releases some energy stored by capacitor CAC.

The pulse width of pulse $PS4_1$ could be preset as a constant, or vary in response to capacitor voltage $V_{CP}$. The higher capacitor voltage $V_{CP}$, for example, the longer the pulse width of pulse $PS4_1$.

Step 326 in FIG. 5A follows step 324, briefly turning high-side switch HSS ON for the second time in a switching cycle to perform ZVS on low-side switch LSS. Control signal $DRV_{HS}$, as shown in FIG. 5B, provides pulse $PS4_2$ a predetermined period of time later after pulse $PS4_1$ to briefly turn high-side switch HSS ON. Pulse $PS4_2$ also provides a chance to further release some energy stored in capacitor CAC. After the end of pulse $PS4_2$, joint voltage $V_{SW}$ drops rapidly. If the pulse width of pulse $PS4_2$ is appropriate, joint voltage $V_{SW}$ can drop low enough to make low-side switch LSS perform ZVS. As demonstrated in FIG. 5B, low-side switch LSS turns ON at the moment when joint voltage $V_{SW}$ is about 0V at the bottom of signal valley $SV_1$, performing ZVS.

Step 328 follows step 326 to conclude this procedure one.

Based on FIG. 5B and the above relevant teaching, there are only two high-side ON times within the present switching cycle, respectively contributed by pulses $PS4_1$ and $PS4_2$. The first high-side ON time corresponding to pulse $PS4_1$ starts about after the end of demagnetization time $T_{DMG}$. The second high-side ON time corresponding to pulse $PS4_2$ starts a predetermined period of time later after the end of pulse $PS4_1$. Both pulses $PS4_1$ and $PS4_2$, or the first and second high-side ON times, start after the end of demagnetization time $T_{DMG}$.

The switching cycle in each of FIGS. 3B, 4B, 4C and 5B contains only two high-side ON times, but this invention is not limited to however. A single switching cycle according to embodiments of the invention might have more than two high-side ON times.

Based on the illustration in FIGS. 3B, 4B, 4C and 5B, it can be understandable that low-side switch LSS is substantially operated under a quasi-resonant (QR) mode. Embodiments of the invention can make low-side switch LSS turned ON at the moment when a signal valley of joint voltage $V_{SW}$ about appears, just like the result from a QR mode, to perform ZVS on low-side switch LSS. FIGS. 3B and 5B both teach that low-side switch LSS turns ON at about the occurrence of the first signal valley $SV_1$. FIG. 4B teaches that low-side switch LSS turns ON at about the occurrence of the second signal valley $SV_2$. FIG. 4C teaches that low-side switch LSS turns ON at about the occurrence of the fifth signal valley $SV_5$.

It is taught that each of steps 106, 124 and 322 waits for the end of demagnetization time $T_{DMG}$, then a next step follows. One way to find the end of demagnetization time $T_{DMG}$ is to detect the moment when voltage drop $V_{AUX}$ drops down across a certain reference and to treat the end of a predetermined period after that moment as the end of demagnetization time $T_{DMG}$. Another way to find the end of demagnetization time $T_{DMG}$ is to have a record indicating the length of demagnetization time $T_{DMG}$ in the previous switching cycle and to treat the moment when the length of demagnetization time $T_{DMG}$ in the current switching cycle is very close to but has not reached the record as the end of demagnetization time $T_{DMG}$ in the current switching cycle. The real end of demagnetization time $T_{DMG}$ in the current switching cycle is still detected to update the record. It is possible that the timing that power controller 14 takes as the end of demagnetization time $T_{DMG}$ differs from the real timing when transformer TF ends its demagnetization process. The difference does not, however, effect the use of the invention, and embodiments of the invention might employ any way to find the end of demagnetization time $T_{DMG}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of an active clamp flyback power converter including a primary winding, an active-clamp circuit connected in parallel with the primary winding, and a low-side switch connected in series with the primary winding in between two power lines, the active-clamp circuit includes a high-side switch and a capacitor connected in series, the control method comprising:
   turning OFF the low-side switch;
   providing a blanking signal capable of defining a blanking time in association with a maximum switching frequency of the low-side switch;
   detecting whether a demagnetization time of the primary winding ends; and
   turning ON the high-side switch at least two times within a switching cycle to generate at least two high-side ON times, one of which begins about after the demagnetization time ends, and the other of which begins about after the blanking time ends.

2. The control method of claim 1, further comprising:
   adaptively adjusting a length of a final high-side ON time within the switching cycle to perform zero voltage switching on the low-side switch.

3. The control method of claim 1, wherein the active clamp flyback power converter supplies electric power to a load, and the control method comprises:
   determining the blanking time in response to the load.

4. The control method of claim 3, wherein the active clamp flyback power converter provides an output voltage to supply the electric power to the load, the control method comprising:
generating a compensation voltage in response to the output voltage and a target voltage;
determining the blanking time in response to the compensation voltage; and
determining a low-side ON time of the low-side switch in response to the compensation voltage.

5. The control method of claim 1, further comprising:
detecting a signal peak after an end of the blanking time; and
starting one of the high-side ON times about when the signal peak appears.

6. The control method of claim 5, wherein the active clamp flyback power converter includes a transformer with the primary winding, a secondary winding, and an auxiliary winding, the control method comprising:
detecting a voltage drop across the auxiliary winding to detect whether the signal peak appears.

7. The control method of claim 5, wherein the active clamp flyback power converter includes a transformer with the primary winding, a secondary winding, and an auxiliary winding, the control method comprising:
detecting a voltage drop across the auxiliary winding to detect whether the demagnetization time ends.

8. The control method of claim 1, wherein the switching cycle contains only the two high-side ON times.

9. The control method of claim 8, wherein one of the two high-side ON times is within the demagnetization time.

10. The control method of claim 8, wherein one of the two high-side ON times starts about when a signal peak appears.

11. The control method of claim 1, wherein all the high-side ON times start after the demagnetization time ends.

* * * * *